United States Patent [19]

Pilarczyk

[11] 3,976,165

[45] Aug. 24, 1976

[54] LUBRICATING AND OIL SEAL SYSTEM FOR A HIGH SPEED COMPRESSOR

[75] Inventor: Karol Pilarczyk, Loudonville, N.Y.

[73] Assignee: Norwalk-Turbo, Inc., Latham, N.Y.

[22] Filed: Apr. 25, 1975

[21] Appl. No.: 571,611

Related U.S. Application Data

[62] Division of Ser. No. 466,877, May 3, 1974.

[52] U.S. Cl. ............................ 184/6.16; 184/6.22; 184/6.24; 415/110; 184/6.1
[51] Int. Cl.² ...................................... F04B 39/02
[58] Field of Search ............ 184/6, 6.16, 6.21, 6.22, 184/6.24, 6.1; 417/405, 406, 407, 408, 409; 415/110, 111, 112, 113; 60/39.08

[56] References Cited
UNITED STATES PATENTS

| | | | |
|---|---|---|---|
| 3,420,434 | 1/1969 | Swearington | 415/112 |
| 3,728,857 | 4/1973 | Nichols | 415/110 |
| 3,871,789 | 3/1975 | Lameris | 415/111 |

Primary Examiner—Richard C. Pinkham
Assistant Examiner—Marvin Siskind
Attorney, Agent, or Firm—Roland T. Bryan

[57] ABSTRACT

A high speed centrifugal compressor is closely directly coupled to the power turbine of a two-shaft gas turbine having a gas generator section separate from its power turbine. Through the direct close coupling and center-line mounting of the gas turbine exhaust casing for free and uniform heat expansion, alignment between stationary and rotating parts of the power turbine and compressor is maintained free from mechanical problems. Bearings and oil seals are fed by an integrated lubrication and a sealing oil system utilizing a compact oil distribution manifold assembly incorporating a quick filter change structure. The gas turbine-compressor finds particularly useful application in areas where high power, compact, relatively maintenance-free units are required, as, for example, on offshore platforms in the natural gas industry.

9 Claims, 9 Drawing Figures

LUBRICATING AND OIL SEAL SYSTEM FOR A HIGH SPEED COMPRESSOR

BACKGROUND OF THE INVENTION

This application is a division of an application Ser. No. 466,877, filed May 3, 1974 and made pursuant to a requirement of restriction.

This invention relates to high speed centrifugal compressors and more particularly to a high speed centrifugal compressor driven by a gas turbine. Centrifugal compressors find applications in various fields and increasing utility in the expanding natural gas industry for such services gas gathering, boosting, transmission, repressuring and distribution, and the like. In the gas boosting area particularly, there is a need for high speed centrifugal compressors which will operate relatively maintenance free, are compact for ease of transportation and installation on site and which are driven by prime movers which use readily available energy sources.

Previously, centrifugal compressors have only been able to operate at high shaft speeds through the use of gear trains interposed between the compressor and the prime mover. However, the use of gear trains not only requires operation supervision, because of lubrication requirements and the like, but may also give rise to maintenance problems typically associated with the presence of moving parts which are subject to wear and breakdown. In addition, the presence of a gear train increases the size and weight of the overall compressor-prime mover unit. While gas turbine engines are capable of delivering high horse power in a compact unit and can provide high shaft speed, their use to drive centrifugal compressors has heretofore not been entirely satisfactory. In particular, the use of turbine engines to drive compressors has led to disadvantages arising from problems of mechanical alignment due to the mechanical coupling between the compressor shaft and the turbine engine power output shaft. These mechanical alignment problems are compounded where the turbine engine has mechanically connected gas compressor and power turbine stages.

Due to the aforementioned drawbacks, there has not previously been available a combined high speed centrifugal compressor-prime mover unit which is both compact and efficient in operation as well as free from alignment and maintenance problems so as to be suitable for process and natural gas industry uses including uses as diverse as offshore platform gas operations.

SUMMARY OF THE INVENTION

The present invention overcomes the disadvantages associated with prior art compressors by providing a high-speed centrifugal compressor closely and directly connected to the power turbine of a two-shaft gas turbine having a gas generator section separate from its power turbine. Through direct coupling of the compressor shaft to the turbine engine power turbine output shaft, the compressor shaft rotates at the same high speed as the speed of rotation of the power turbine. Thus, according to this invention, a centrifugal compressor having a single stage or a plurality of stages may be driven by a gas turbine engine having a power shaft rotation of 33,000 rpm in a 650 nominal horse power engine with the result that natural gas compression at pressure ratios up to 6 to 1 may be obtained in a compact and efficient compressor-driver unit. The compactness and light weight of such a unit is exemplified by the fact that it takes up only 16 square feet of floor area and weighs approximately 3,400 pounds, making it readily trailer mounted for ease of transportation by light truck or by air lift to on site locations such as offshore platforms. Arranged in series, such units can compress gas from as low as atmospheric pressure to as high as 1500 psig. Used in parallel, large gas flows can be handled.

An advantage to the compactness and efficiency of the gas turbine driven compressor unit of this invention, particularly in natural gas applications, is the forced feed compressor oil system combining a compressor seal oil system with the power turbine-compressor lubrication oil system. By combining these oil systems in a manner that minimizes piping, pump and valve duplication, risk of down time due to oil system problems is reduced and low maintenance bearing operation, useful in applications where high on stream time is particularly desirable, is possible according to this invention. Adequate sealing means are also important in high pressure applications of this turbine driven compressor unit, especially in natural gas uses where it is necessary to keep combustible gases from leaking to the hot areas of the power turbine and exhaust discharge casing. Hence, another object of this invention is the provision of a combined compressor seal oil and bearing lube oil system of the forced feed type which may be prepiped for ready use as part of the gas turbine-compressor unit.

The oil seals and bearings may be advantageously contained together in a cartridge assembly providing for ease of oil feed and maintenance. If desired, high pressure oil may be fed to the oil seal within the cartridge assembly and therein fed to the bearings after having its pressure reduced by orifice passageways contained therein. Therefore, another object of this invention is the provision of a oil seal and bearing cartridge assembly which facilitates gas sealing and lubrication of the compressor rotating shaft.

The sealing oil and lubricating oil system includes therein an oil distribution manifold system including filters for filtering both the high pressure sealing oil and lower pressure lubricating oil. The manifold includes a transfer valve that permits removal, servicing and replacement of a clogged filter without shutting down the system and without the need for providing a highly duplicative piping system. Thus, a yet further object of this invention is the provision of an oil distribution manifold system including readily changeable filters which do not necessitate shut down for servicing.

BRIEF DESCRIPTION OF THE DRAWINGS

The above objects, aspects and advantages of the invention as well as others will become more apparent from the following detailed description of a preferred embodiment of the invention as shown in the drawings herewith in which.

DETAILED DESCRIPTION OF THE DRAWINGS

Figure 1:
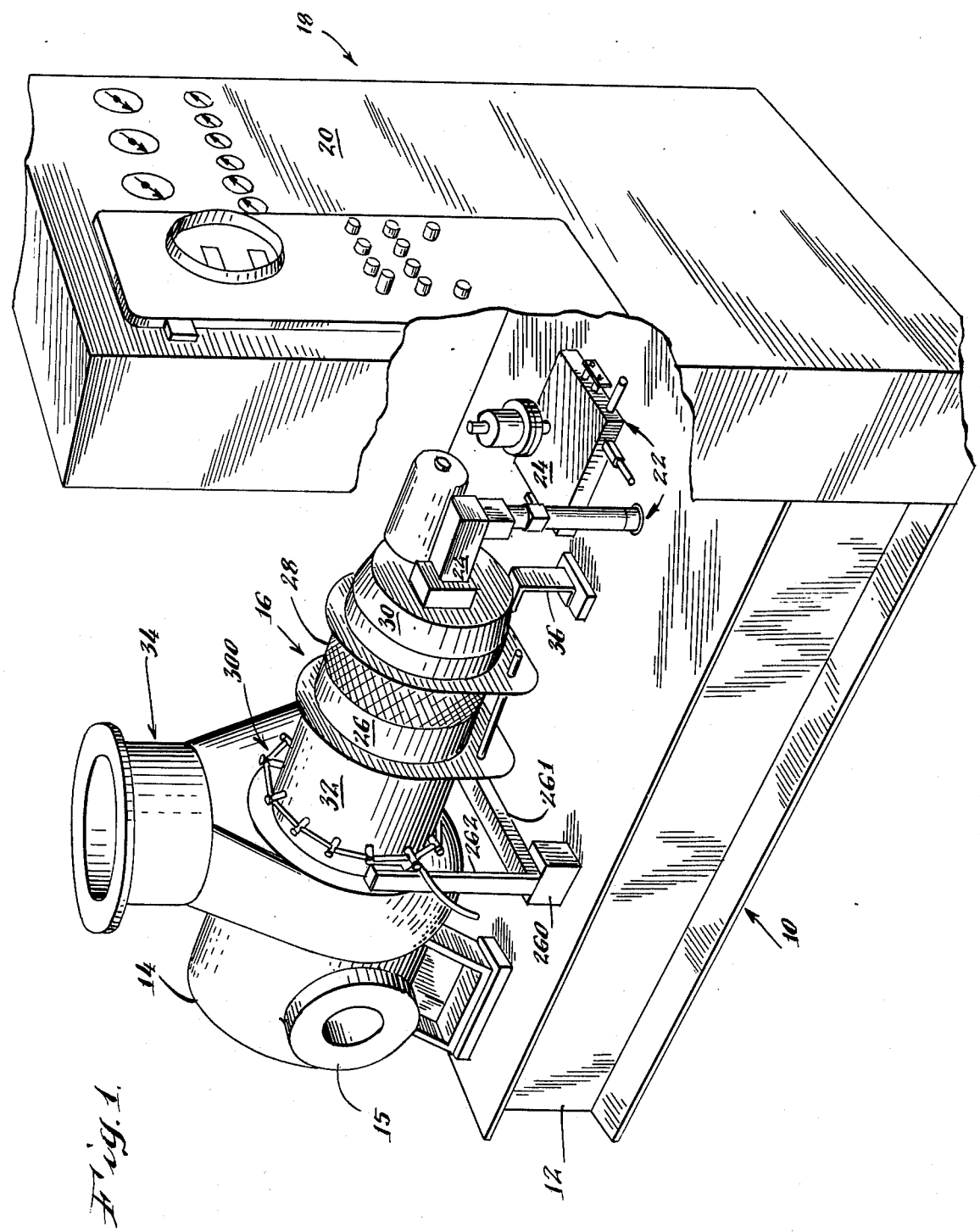
FIG. 1 is a perspective view of a complete compressor-gas turbine unit package incorporating the features of the present invention.

Referring to FIG. 1 there is shown a complete compressor-gas turbine unit package indicated generally at 10. The complete compressor-gas turbine unit package includes a rigid base plate 12 on which is mounted a centrifugal compressor 14, a gas turbine engine 16 and a control system 18 for continuous duty and fully automatic unattended operation. As shown generally on the control system panel 20, the control system may include means for indicating speed, pressure and temperature, as well as automatic starting, running and protective shut down controls. Also shown generally, as part of the compressor-gas turbine unit package 10 of FIG. 1 are the compressor lubrication oil and sealing oil system, shown generally at 22, with the oil distribution manifold and filter means 24.

The gas turbine engine 16 includes a gas generator section 26 having an annular screened air inlet 28. The gas generator section of the turbine engine also includes an accessory gear box 30. The combustion and power output section of the gas turbine engine is shown generally at 32 while the hot gas discharge exhaust is shown at 34.

The gas generator section 26 of the gas turbine is of conventional design and may be of the type available from United Aircraft of Canada Ltd., under the designation Pratt & Whitney ST6. The gas generator section has no mechanical connection between its compressor turbine and the power turbine of the engine so that the engine has two shafts, a compressor section shaft and a power output transfer shaft connected to the power turbine. The commercially available gas generator section 26 may have its own lubrication system integral with the gas turbine. Also included with the conventional gas generator section is an accessory gear box 30 which may be utilized in this package to drive the pump of the force feed oil system 22. Since the gas generator section 26 is essentially a self-contained unit, it may be readily mounted directly on the power turbine exhaust discharge case and is easily dis-connected therefrom without the need for any time consuming major disassembly of piping or other equipment. The gas generator section 26 is mounted on the rigid base plate 12 by means of a flex plate 36 located at its forward end away from the power turbine section. The flex plate 36 is sufficiently rigid to support the gas generator section 26 while sufficiently flexible to permit expansion, due to forces generated by heat stresses, in the direction of the axis of rotation of the compressor of the gas generator. The ST6 gas generator commercially available is a short compact unit which when coupled with a power output section can provide approximately 655 horse power with a power output shaft rotation as high as 33,000 rpm.

Figure 2:
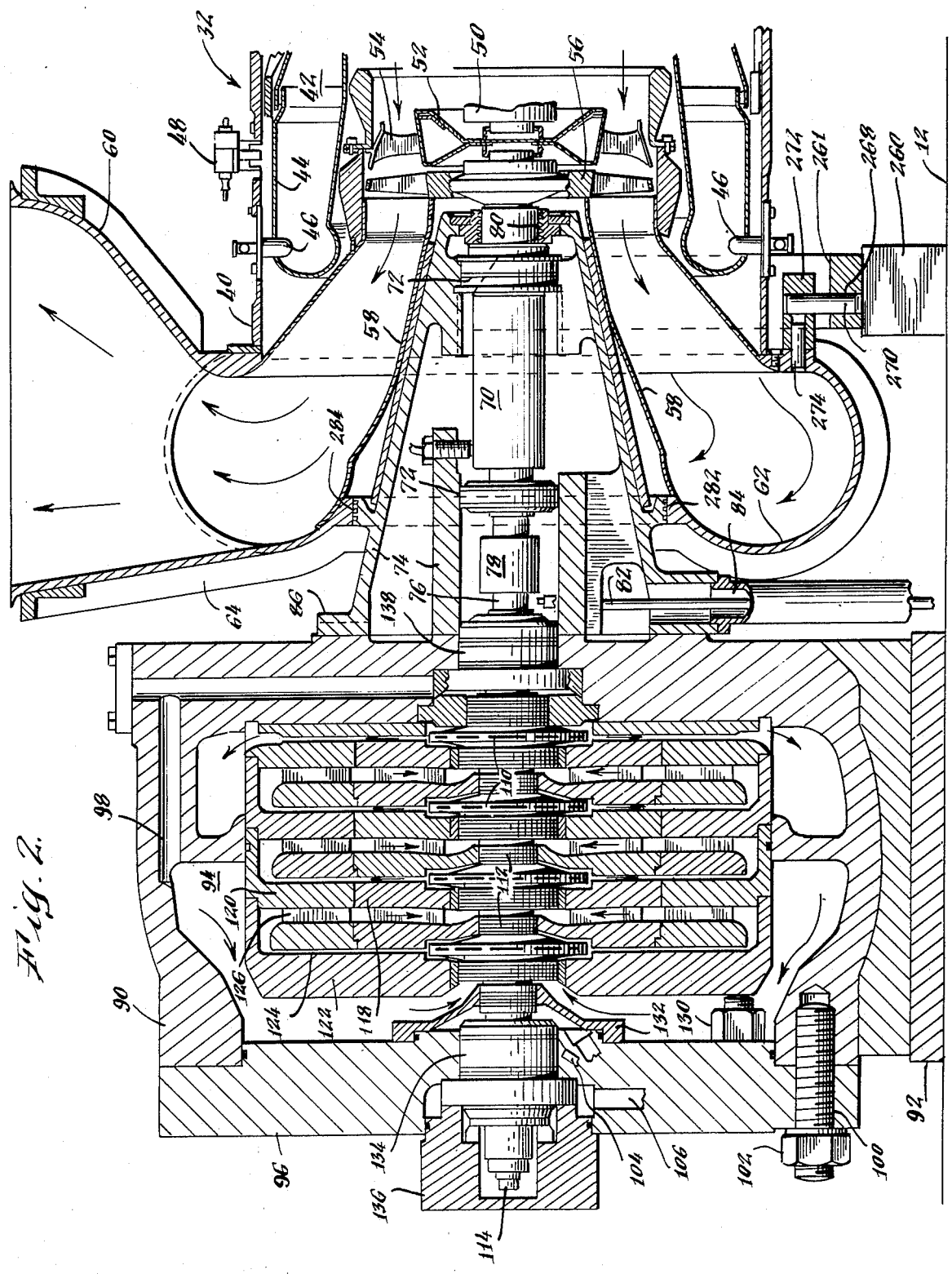
FIG. 2 is a cross-sectional view taken along a vertical plane through the axis of rotation of the compressor and power turbine showing the compressor and the power turbine section of the gas turbine engine.

Referring to FIG. 2, there is shown a cross-sectional view taken vertically through the axis of rotation of the compressor and including the compressor 14 and the combustion and power output section 32 of the turbine engine 16. The gas generator section, being conventional, is not shown in detail. The combustion and power section 32 includes the turbine outer wall barrel 40 surrounding an annular combustion chamber 42. Compressed air from the gas generator section enters the combustion chamber 42 from the area between the outer turbine casing 40 through the perforated combustion chamber lining 44. Fuel nozzles 46 project into the combustion chamber 42 while an ignitor assembly is shown at 48. Partially shown is a portion of the hub of the engine compressor turbine wheel 50 to the right of the separator 52.

As shown by the arrows in FIG. 2, after passing through the compressor turbine wheel, the combustion gases pass through the diffuser vanes 54 and impinge upon the power turbine wheel 56 to drive it. Stainless steel liners 58 direct the exhaust gases to the turbine exhaust discharge casing 60. The discharge casing has an annular partial toroidal shape as shown at 62 which exhausts the gases to the atmosphere through the bell mouth discharge exhaust 34. The discharge casing 60 is a unitary cast iron structure which is mounted on the base plate 12 by means of flex plates as will be explained in further detail hereinafter in connection with FIG. 6. The exhaust discharge casing 60 is covered with insulation as shown at 64.

The power turbine wheel 56 is mounted on power transfer shaft 70 which rotates in tilting shoe bearings 72 mounted in bearing bracket 74. In the embodiment shown in FIG. 2, the power transfer shaft 70 is joined to the compressor power input shaft 76 by means of a splined tooth coupling 78. A hot gas seal 80 prevents the hot turbine gases from leaking into the bearing bracket area. Means for feeding lubricating oil to the tilting shoe bearings 72 are shown at 82 while a drain for spent oil is shown at 84. The drain 84 also acts as a shield of the lube oil feed means 82 so that in the event that the lube oil feed means 82 should rupture, oil will not be sprayed on the hot gas discharge casing 60. The bearing bracket interior is vented to the atmosphere at 86.

The centrifugal compressor shown in FIG. 2 is of barrel type construction having a vertically split steel casing 90 incorporating in-line inlet and discharge flanges. The discharge flange 15 is shown in FIG. 1. The compressor casing 90 is rigidly secured to the base plate 12 by means of the compressor base 92. The compressor casing 90 is of one piece cast construction which is further machined to have a bore or chamber 94 which accepts the stage elements of the centrifugal compressor. A compressor end cover 96 further defines the chamber while the bore vent 98 provides a pressure balancing line. The end cover 96 is removably secured to the casing 90 by means of studs 100 and stud nuts 102. Machined into the end cover 96 are an oil feed line 104 and oil drains 106.

The compressor embodiment illustrated in FIG. 2 contains four stages, each stage being substantially comprised of the following similar elements shown in FIG. 2. Referring to FIG. 2, there is seen the impellers 110 mounted together with labyrinth seals 112 in a rotor assembly which is joined together under tension by means of a tension bolt 114. Each stage is made up of an impeller 110, a guide vane assembly 118 and a diaphragm 120. An interstage seal 112 is also provided. The impeller 110 has blades 111 which are covered by the impeller shroud 109 indicated generally. The impeller may be of the open-face or shrouded type shown as illustrative, it being understood by those skilled in the art that the blade characteristics can be selected by the designer according to known procedures to suit the service conditions required. Positioned over the impeller 110 is the inlet guide vane assembly 118 which has integrally cast therein guide vanes 128. The inlet guide vane assembly 118 is horizontally split for positioning over the impeller 110 prior to assembly in the compressor casing 90. Each half of the inlet guide vane assembly is of one-piece cast construction. Concentrically surrounding the inlet guide vane assembly 118 is a diaphragm 120 shown in total cross-section in FIG. 10 exposing the return vanes 126. The diaphragm is of one-piece cast construction with the return vanes 126 integrally cast therein. As seen in FIG. 2, the stacked stage elements interfit with one another to form a tight barrel assembly which tightly fits within the compressor casing 90 and is held therein by means of compressor bolts as shown at 130. Conventional O-ring sealing means may be provided to assure a tight fit, however, no special fastening means are required because of the excellent interengagement of parts. Gas flow is shown by the arrows.

Referring to FIG. 2, the first diaphragm and guide vane assembly, proceeding from left to right, form with the inlet shroud 122 a vaneless diffuser passageway 124 to conduct compressed gas from the discharge of the impeller 110 to the next stage. From the vaneless diffuser 124, the gas passes through the return vanes 126 of the diaphragm and thence through the guide vanes 128 to the inlet of the impeller of the next stage. A shroud 132 covers a cartridge assembly 134 containing the thrust bearing and oil seal for the compressor rotor shaft at the intake end. This entire cartridge assembly is covered with an end cover 136. The compressor shaft also rotates within a cartridge assembly 138 at the outlet end of the compressor which also contains a journal bearing and oil seal.

Although the compressor embodiment shown in FIG. 2 has four stages, a compressor according to this invention may have from one to four stages of compression, even in the identical casing 90, if desired, by utilizing appropriately sized elements. For example, in a single stage embodiment the cartridge assembly 138 with its thrust bearing and oil seal can be eliminated by providing the impeller and other stage elements at the extreme right side of the compressor in the area occupied by stages three and four of the compressor shown in FIG. 2. Furthermore, the impeller of a single stage unit may be mounted on a shaft which is integral with the power transfer shaft 70 thus eliminating the coupling 78 and the bearing 72 nearest thereto. Thus, the impeller of a single stage compressor embodiment may be mounted on the cantilevered portion of an overhung shaft while still providing the close direct coupling to the power turbine wheel 56.

Figure 3:
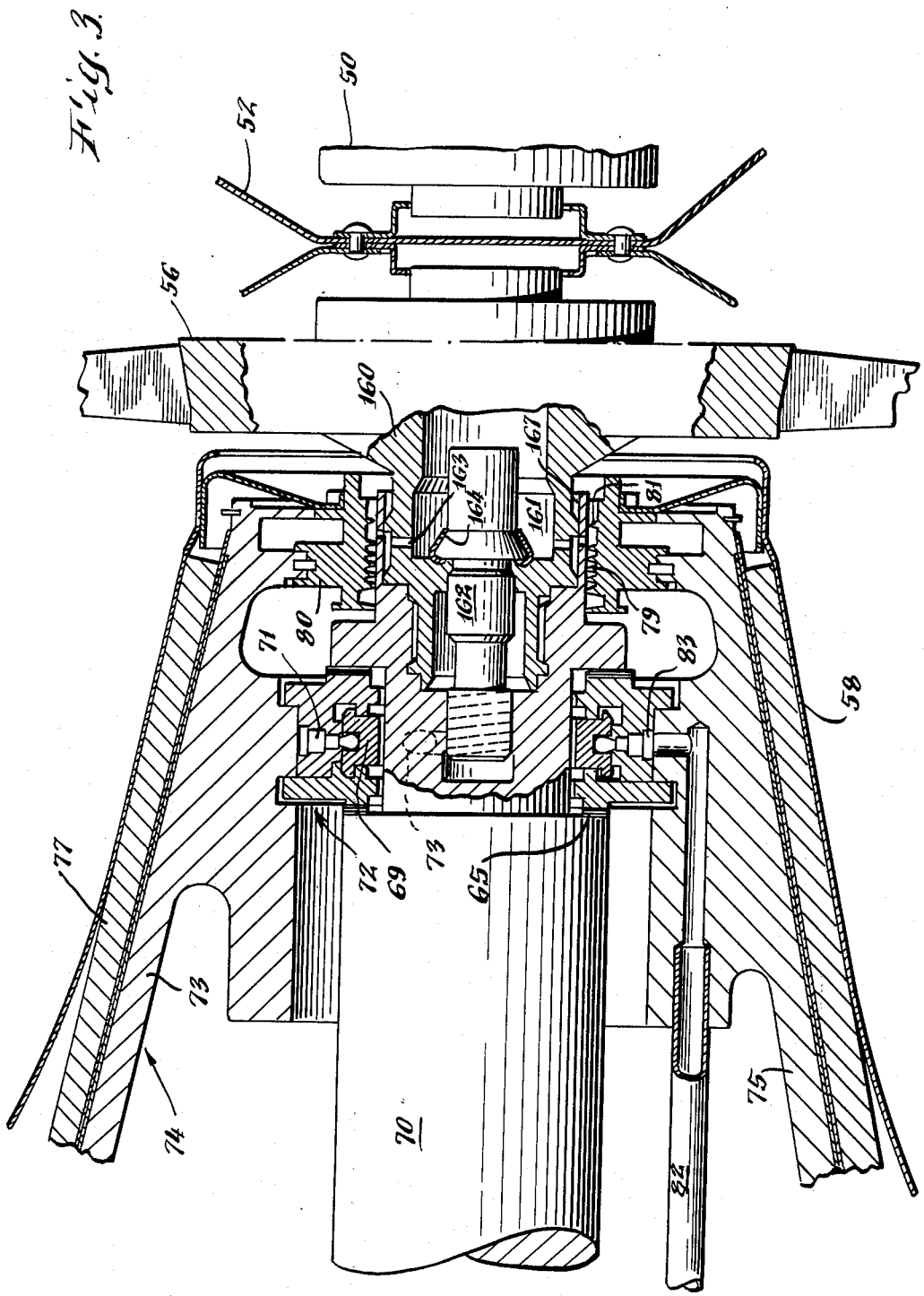
FIG. 3 is a vertical cross-sectional view showing, in enlarged detail, the turbine power section including the power transfer shaft and hot gas seal.

FIG. 3 shows in enlarged detail the power wheel 56 assembled to the power transfer shaft 70. The power wheel 56 has a hollow shaft 160 which is joined to the power transfer shaft 70 by means of a spline and a tightening bolt 162 secured in place by lock ring 164. The power transfer shaft rotates within tilting-shoe journal bearing 72 and hot gas seal 80, as shown also in FIG. 2. The journal bearing 72 and hot gas seal 80 are held in the bearing bracket 74 comprised of an upper half bearing bracket 73 and a lower half bearing bracket 75 shown covered with insulation 77. The hot gas seal 80 has labyrinth sealing edges 79 which seal surface of the rotating power transfer shaft 70. The sealing edge or vane shown at 81 constitutes a metering vane which operates in the following manner.

Cooling air utilized in the turbine passes through the hollow shaft 160 of the power turbine 56 and into the cavity 161 therein. From the cavity 161, this cooling air passes through the opening 163 in the shaft 160 and through opening 165 in the cylindrical collar 167 of the power transfer shaft 70 to pass over the edge of the metering vane 81 from whence it is drawn along the edge of the power turbine 56 and, by venturi effect, along the inside of the combustion chamber liner 58 for cooling thereof.

Also shown in detail in FIG. 3, is the journal bearing 72 comprised of a housing 67 within which are circumferentially positioned tilting shoes 69 held in place by positioning means shown generally at 71. The bearing housing may be split and the halves joined together by means indicated generally at 73. Lubricating oil is fed into this journal bearing 72 through the lubricating oil line 82, an extension of the line shown in FIG. 2, through the lower bearing bracket 75 into an annular recess 83 of the bearing housing 67. The oil flows over the shoe 69 within the bearing and leaks out over the top of the shoe 69 into the bearing bracket area from which it is eventually drained through the drain 84 shown in FIG. 2. The bearing 72 carrying the end of the power transfer shaft 70 may operate not only as a journal bearing but also functions as a thrust bearing with annular thrust faces shown at 65.

Figure 4:
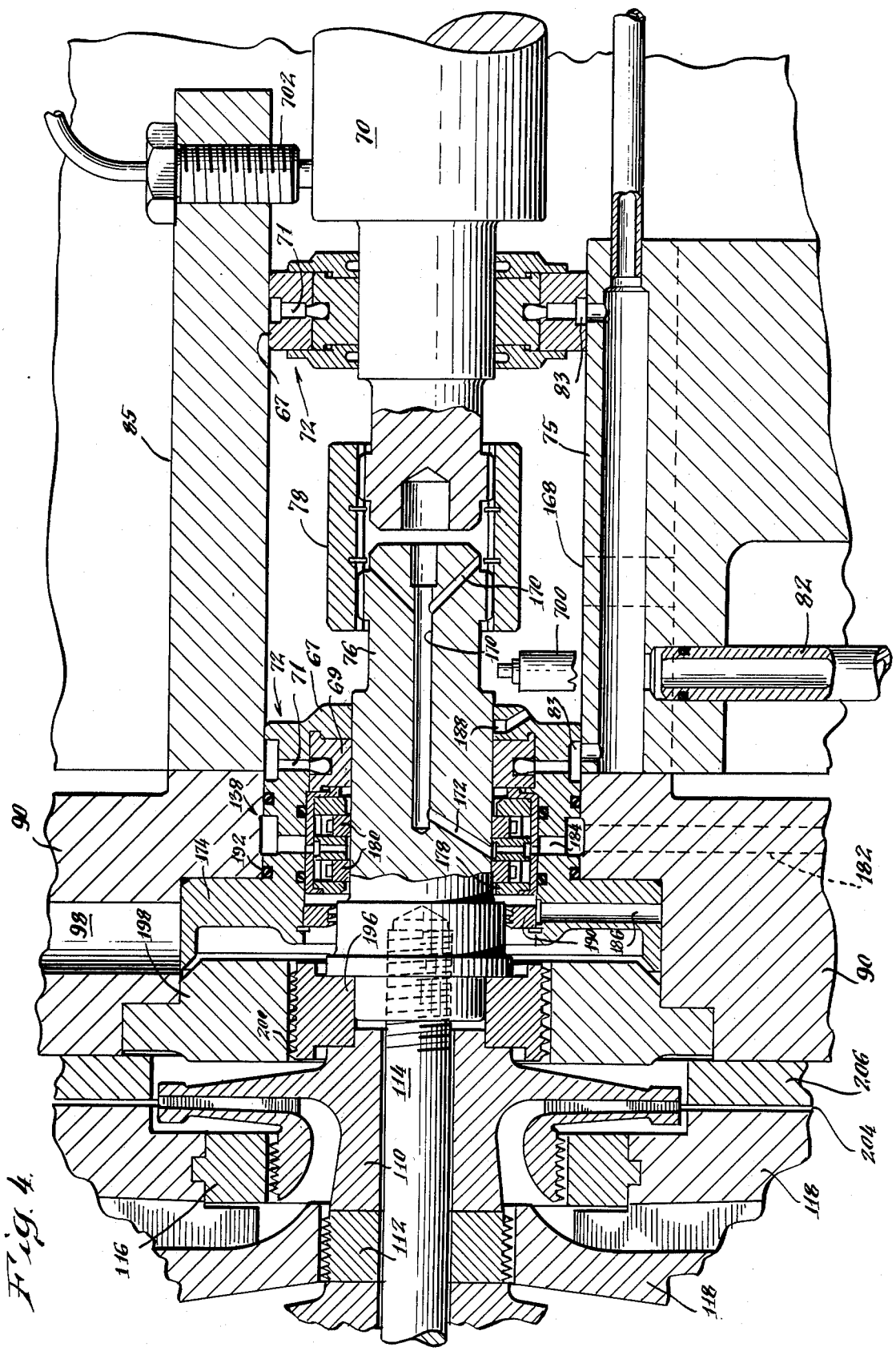
FIG. 4 is a vertical cross-sectional view showing, in enlarged detail, the direct close coupling between the compressor shaft and power transfer shaft including the journal bearing and oil seal cartridge assembly therein.

Referring now to FIG. 4, there is shown, in enlarged detail the area of the direct coupling between the power transfer shaft 70 and the compressor power input shaft 76. As shown in FIG. 2 also, the power transfer shaft 70 rotates within a tilting shoe bearing 72 positioned in the inner cap 85 and lower half 75 of bearing bracket 74. The bearing 72 is similar to the other tilting shoe journal bearing and like parts are therefore identified by like numbers. The compressor shaft 76 is joined to the power transfer shaft 70 by a splined-tooth coupling 78. The compressor shaft 76 contains passageways 170 by which oil is fed to the coupling 78 which is of the self aligning type. The oil from this coupling enters the bearing bracket area and is drained to the drain 84, shown in FIG. 2, via the drain 168. The oil in passageways 170 originates from the high pressure sealing oil system via sealing oil feed line 182 and its high pressure reduced by the passageway 172 which functions as a pressure-reducing orifice.

The compressor shaft 76 rotates within a journal bearing and seal cartridge assembly 138. The journal bearing and the seal cartridge assembly 138 is comprised of a housing 174 which contains a tilting shoe journal bearing 72 of the type surrounding the power transfer shaft previously described in reference to FIG. 3. Like numbers here indicate similar elements. The housing 174 also contains a floating carbon ring seal identified generally at 176. The carbon ring seal 176 contains, within a housing 178, carbon rings 180 over the surface of which passes high pressure sealing oil to form an effective gas seal. The sealing oil is introduced via the sealing oil feed line 182 within the compressor casing 90 and enters the cartridge housing 174 and sealing ring through the oil passageway 184. The sealing oil passes over the top of the carbon rings and a quantity is passed through the reducing orifice 172 for lubrication of the coupling 78.

Oil continuously flows over the surface of the carbon seal rings and out the drain 186 in the casing 90, as well as through the drain 188 located in the housing 174 which collects the oil from both the journal bearing and the sealing ring. While the lubrication oil is generally at a pressure ranging from 15 to 35 psig the sealing oil must be at pressure 10 to 25 psi higher than the pressure of the gas in the compressor in order to insure against gas leakage. The oil seal and bearings are partially sealed from the high pressure region of the compressor by means of a labyrinth gas seal 190. The entire journal bearing and oil seal cartridge assembly 138 is maintained in place in the compressor casing 90 through a tight sealing fit with O-rings shown generally at 192.

The compressor power input shaft 76 is joined to the rotor assembly, shown generally at 194 by means of the tie bolt 114. The rotor assembly comprises the impellers 110 and labyrinth seals 112 maintained together under tension by means of tie bolt 114 which is placed through the rotor assembly elements threaded into the compressor shaft 76 and tensioned prior to securing. The shaft 76 and rotor assembly 194 juxtapose the balancing drum 196 which rotates in the balancing ring 198 fitted into the compressor casing 90. The balancing drum 196 has vanes 200 to provide a gas seal. Referring to FIG. 2, there can be seen the balancing line vent 98, also shown in greater detail in FIG. 4; which equalizes pressure on the ends of the rotor assembly within the compressor by permitting the gas to exert a force on both ends thereof. Here, the force will be exerted on the face of the balancing drum exposed in the cavity area 202. Also seen in FIG. 4 are portions of the stage elements, namely, the impeller 110, interstage seal 116 and the inlet guide vane assembly 118. A discharge passageway for the high pressure gas is shown at 204 formed by the guide vane assembly 118 and end plate 206.

Figure 5:
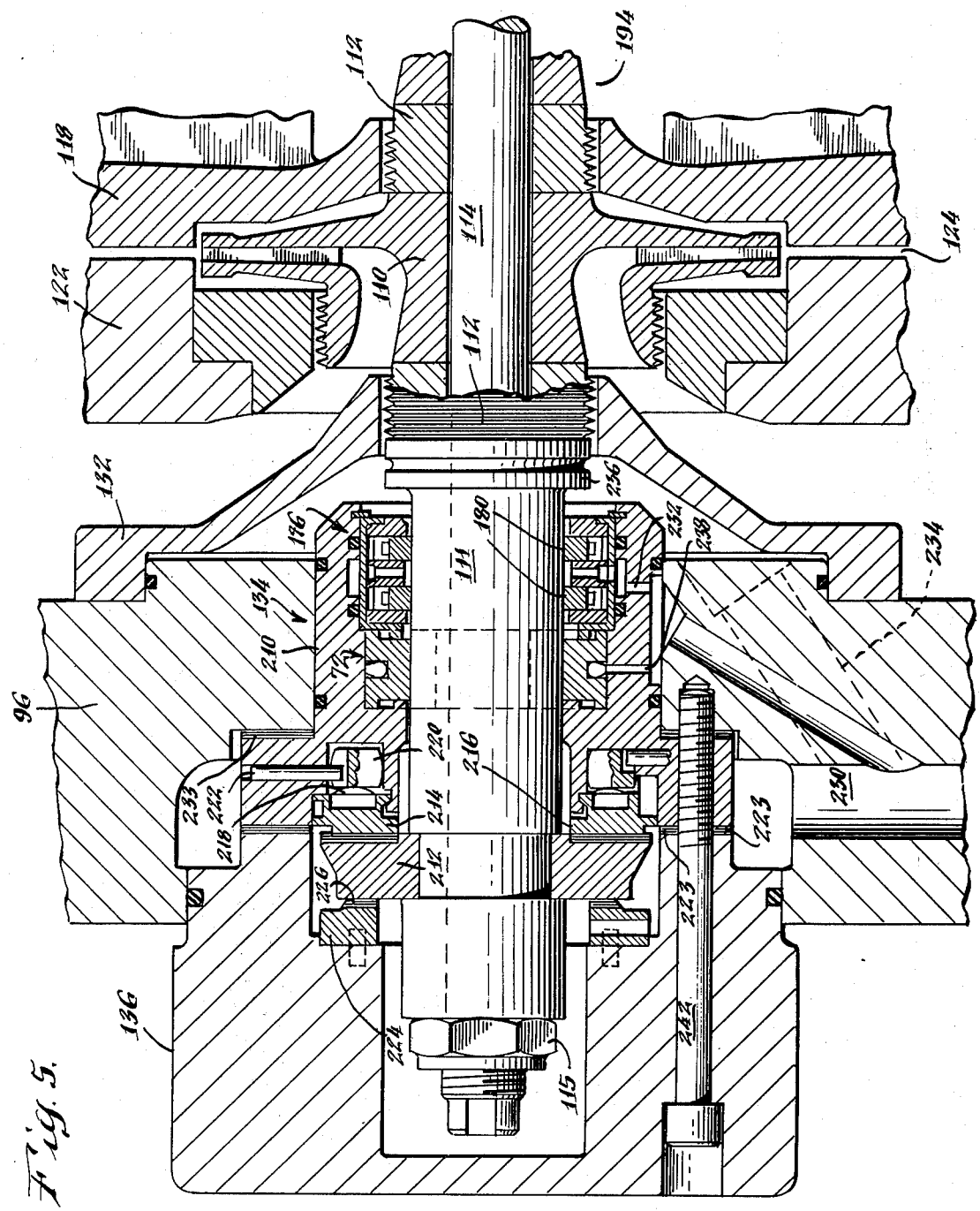
FIG. 5 is a vertical cross-sectional view showing, in enlarged detail, the compressor inlet area including the thrust bearing and oil seal cartridge assembly and means for feeding oil thereto.

FIG. 5 shows, in enlarged detail, the rotor assembly 194 in the area of the first stage of the compressor and the manner in which it rotates in the bearings and seals in the cartridge assembly 134 in the compressor end cover 96. The rotor assembly includes a stud shaft 111 which is joined to the impellers 110 and labyrinth seals 112 by means of the tie bolt 114. For assembly, the rotor elements are stacked together and the tie bolt 114 passed therethrough and tensioned. While the bolt 114 is tensioned, tightening nut 115 is tightened so that secure compression fit is achieved upon release of tensioning of the bolt 114.

Positioned in the casing end cover 96 is the thrust bearing and seal cartridge assembly 134. This cartridge assembly includes the end cover 136 and a housing 210 which contain the rotating thrust runner 212 and the stationary thrust shoe 214. The thrust shoe 214 is an annular element having thrust faces 216 on its contacting side and means permitting it to pivot on its rear side. These pivoting means are indicated at 218 as bearing against the plugs 220 held in place with rods 222. Individual thrust shoes assembled peripherally are also shown at 224 with thrust faces 226 which contact the thrust runner 212. Shims are shown at 223.

Also contained within the cartridge assembly housing 210, as shown in FIG. 5, are tilting shoe journal bearing 72 floating carbon ring oil seal 176, similar to those previously described also. Lubrication and sealing oil is obtaind from high pressure sealing oil line 230 in casing and cover 96. The sealing oil passes to the sealing ring 176 through an oil passageway 232 and passes over the surfaces of the floating carbon rings 180 into the area between the shroud 132 and the end cover 96. There the oil drips into the drain shown by dotted lines at 234. Entrained in this oil may be gas which has leaked from the compressor gas area through the labyrinth seal 112. The seal 112 in this region has special edges 236 in the area between the shroud 132 and the end cover 96 to fling the oil outwardly and thence down through the drain.

In the cartridge assembly 134 of FIG. 5, sealing oil is also used for lubrication purposes and thus its high pressure has to be reduced. This is accomplished by passage to the bearing areas through pressure reducing orifice passageways 238. Oil in the thrust runner bearing area is permitted to rise to a level so that the entire thrust runner 212 is bathed in oil. Any excess oil flows through a hole, not shown, in the cartridge housing and runs to the drain. The cartridge end cover 136 is secured to the casing end cover 96 by means of a bolt 242.

Figure 9:
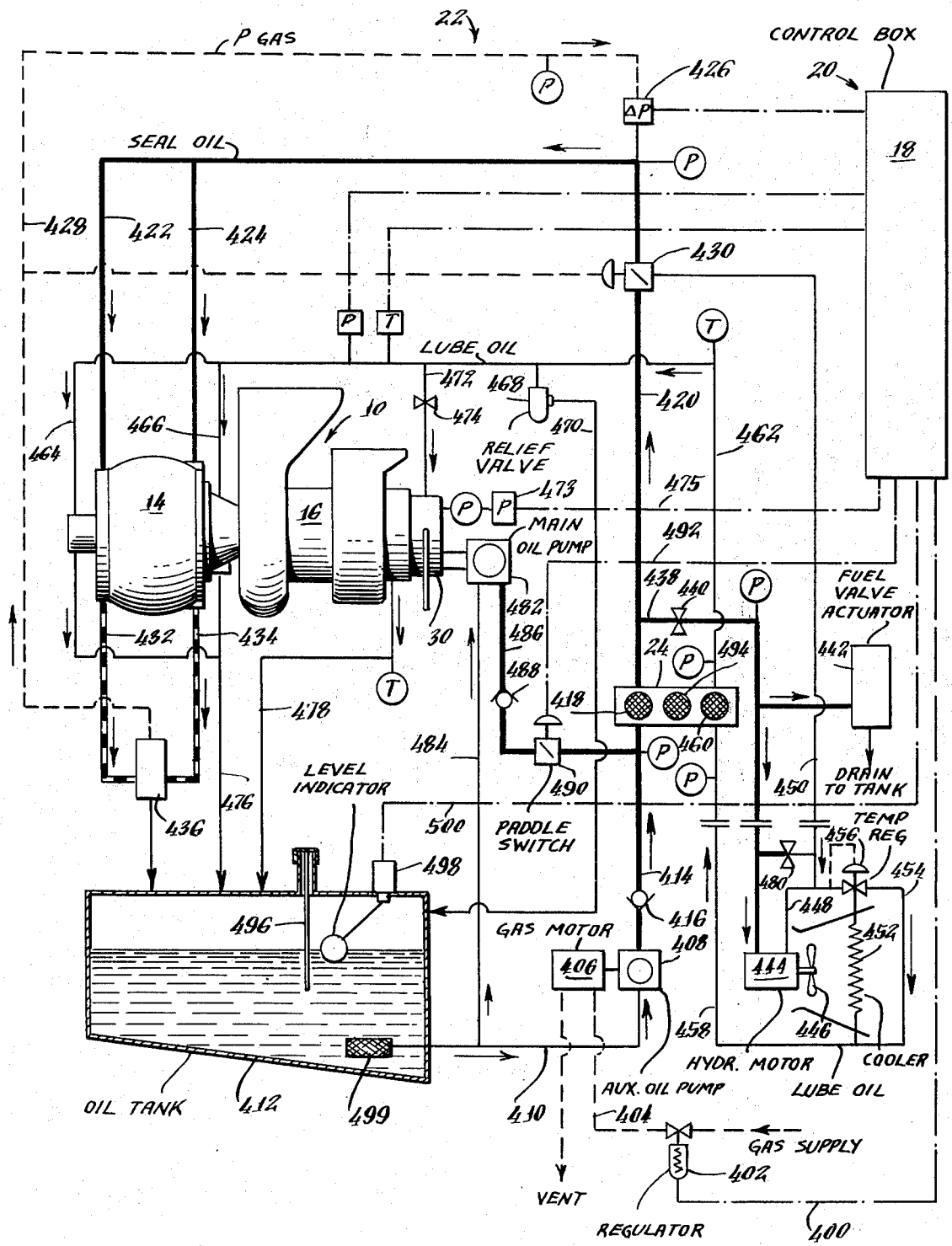
FIG. 9 is a schematic of the oil system for providing lubrication and sealing oil to the compressor.

Referring to FIG. 9 there is shown a schematic illustration of the combined and integrated lubrication and sealing oil system 22 used to provide oil to the floating carbon ring seals and the thrust and journal bearings of the gas turbine-compressor unit. In FIG. 9, the turbine-compressor unit is shown diagrammatically at 10 and the lubrication and sealing oil system is that shown generally at 22 in FIG. 1. The compressor is shown at 14 while the turbine engine is represented at 16 with its accessory gearbox 30. Control of the lubrication and sealing oil system is provided by the control system 18 in the control panel 20. In FIG. 9, as will be explained in greater detail hereinafter, the heavy solid lines represent lines carrying high pressure oil while the lighter solid lines represent those carrying lower pressure oil. Also shown are pressure and temperature measuring devices which in some instances provide a signal for control of the components of the system and in other instance merely provide the operator with an awareness of conditions in the system.

The combined lubrication and sealing oil system will be explained in the manner which it operates. Prior to start up of the compressor, oil is fed to the bearings and seals thereof in order to assure that no damage occurs. This is accomplished by the operator at the control panel sending an appropriate signal along the line 400 to the gas regulator 402 to permit gas, for example, from the natural gas supply such as a pipeline or the like, to enter the gas motor 406 via line 404. The gas motor operates the auxiliary oil pump 408 which obtains oil from the oil supply tank or reservoir 412 via the oil supply line 410. Other means of operating the auxiliary pump may be provided.

The auxiliary oil pump 408 pumps the oil through line 414 at a pressure up to 1,000 psig. The line 414 includes a check valve 416 the function of which will be hereinafter described. The high pressure oil in line 414 passes through a filter 418, to remove any possible contaminants therein, contained in the oil distribution manifold 24. After passing through the filter 418, the high pressure oil is conducted to the compressor seals via lines 420, 422, and 424. Since the sealing oil must always be approximately 10 to 25 psi pressure higher than the pressure of the gas in the compressor, the pressure in line 420 is determined by the differential pressure metering device 426 which senses the pressure of the gas in the compressor from the gas bleed line 428 and the pressure of the oil in line 420. Pressure reduction may be obtained with the regulation valve 430 which also receives the signal of the gas pressure from the gas bleed line. After passing through the seals and into the compressor oil drain, the sealing oil is mized with gas from the compressor and exits via drain lines 432 and 434, shown as heavy dashed lines, to a high pressure drainer 436 which periodically blows the oil back into the oil tank 412.

Branching off from the high pressure oil line 420 is a line 438 in which is located a pressure reducing orifice 440 which reduces the pressure of the oil to approximately 560 psig. Monitoring the pressure in line 438 is a fuel valve actuator 442 which assures that the compressor unit is prevented from starting up until the lubricating and sealing oil pressures have built up to the desired level, therein, assuring that the bearings and seals have been oiled. The intermediate pressure oil in line 438 passes into a hydraulic motor 444 where it operates the cooling fan 446 and from thence it passes, at a lower pressure of approximately 60 psig, to the line 448. Also feeding into line 448 is line 450 which carries oil from the high pressure line in order to aid in controlling the pressure of the oil in the high pressure line 420.

The oil at 60 psig pressure then passes through the cooling coil 452 or, if the temperature of the oil is not so high as to require cooling, through the bypass line 454. The temperature of the oil is sensed and a signal sent to the three way regulating valve 456 which adjusts to send the oil through the bypass or through the cooler depending upon the temperature requirements. As it leaves the cooler, the oil is now at a pressure of 40 to 50 psig and cooled and suitable for lubricating the bearings of the compressor-turbine unit. From the cooler, the oil passes through line 458 through the low pressure filter 460 of the manifold 24 to the bearings of the compressor via lines 462, 464 and 466. Since the lubrication oil should be in the range from 20 to 35 psig, there is provided a relief valve 468 which will relieve the pressure by sending oil back to the oil tank 412 via the line 470. If desired, lubrication can also be provided to the engine system via line 472 with appropriate reduction in pressure by means of orifice 474 located therein. In such instance, the pressure therein may be monitored by device 473 sending a signal to the control system 18 via a line 475. However, it is contemplated that the lubrication system of the engine will be self-contained and may have its own feed independent of the compressor system if desired. Lubrication oil drains back to the oil tank 412 from the compressor via drain line 476 and from the engine via drain line 478. The hydraulic motor powered by the high pressure oil is prevented from being exposed to damaging high pressures by the pressure reduction means provided by the orifice 480 which feeds into the line 450.

Once the sealing and lubricating oil is flowing through the system at sufficient pressures and the gas turbine-compressor unit starts up, the main oil pump 482, driven by the accessory gear box 30, is filled with oil from the line 410 via line 484. The main oil pump begins to pump oil through line 486 which contains a check valve 488 to prevent back flow until such time as it is able to build up sufficient pressure to take over for the auxiliary pump. At such time, the flow paddle switch 490 sends a signal to the control system 18 via a line 492 which then sends a signal back along line 400 to stop the gas feed to the gas motor 406. Once the main pump takes over completely for the auxiliary pump, the check valve 416 prevents any damaging oil back flow to the auxiliary pump.

Figure 6:
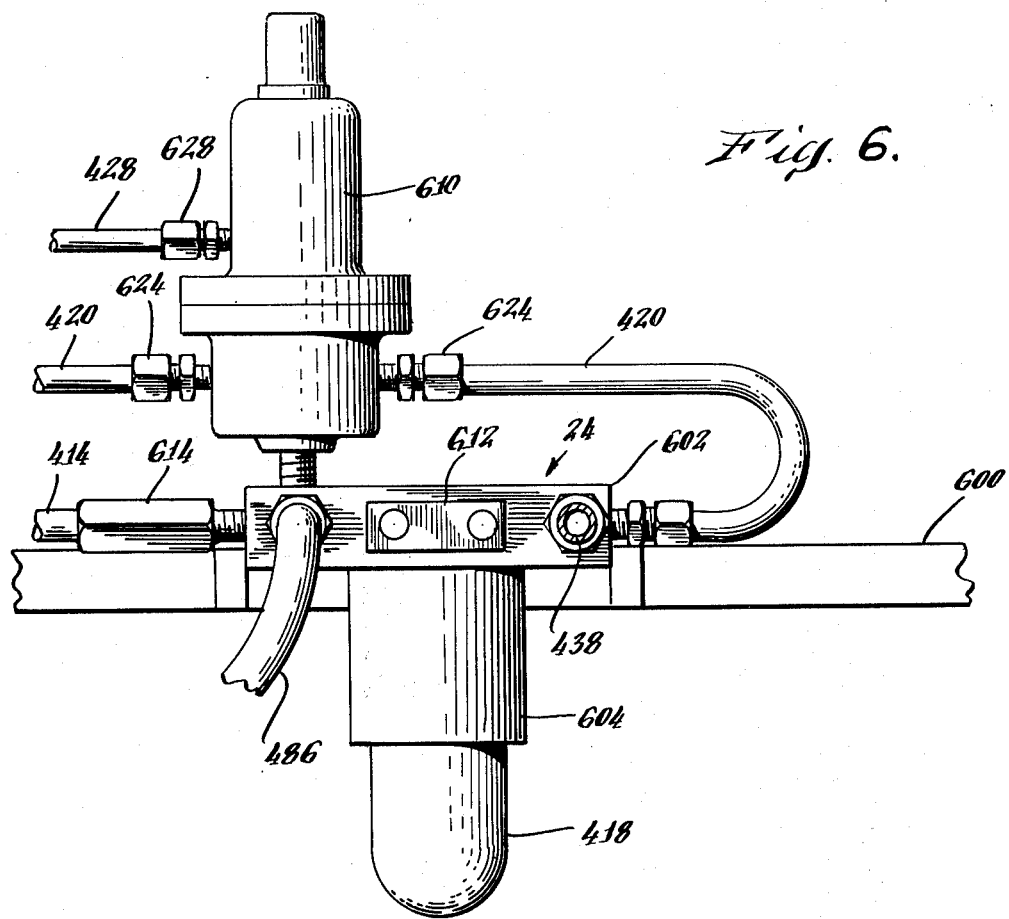
FIG. 6 is an end elevational view of the oil manifold and filter system shown generally in FIG. 1.
Figure 7:
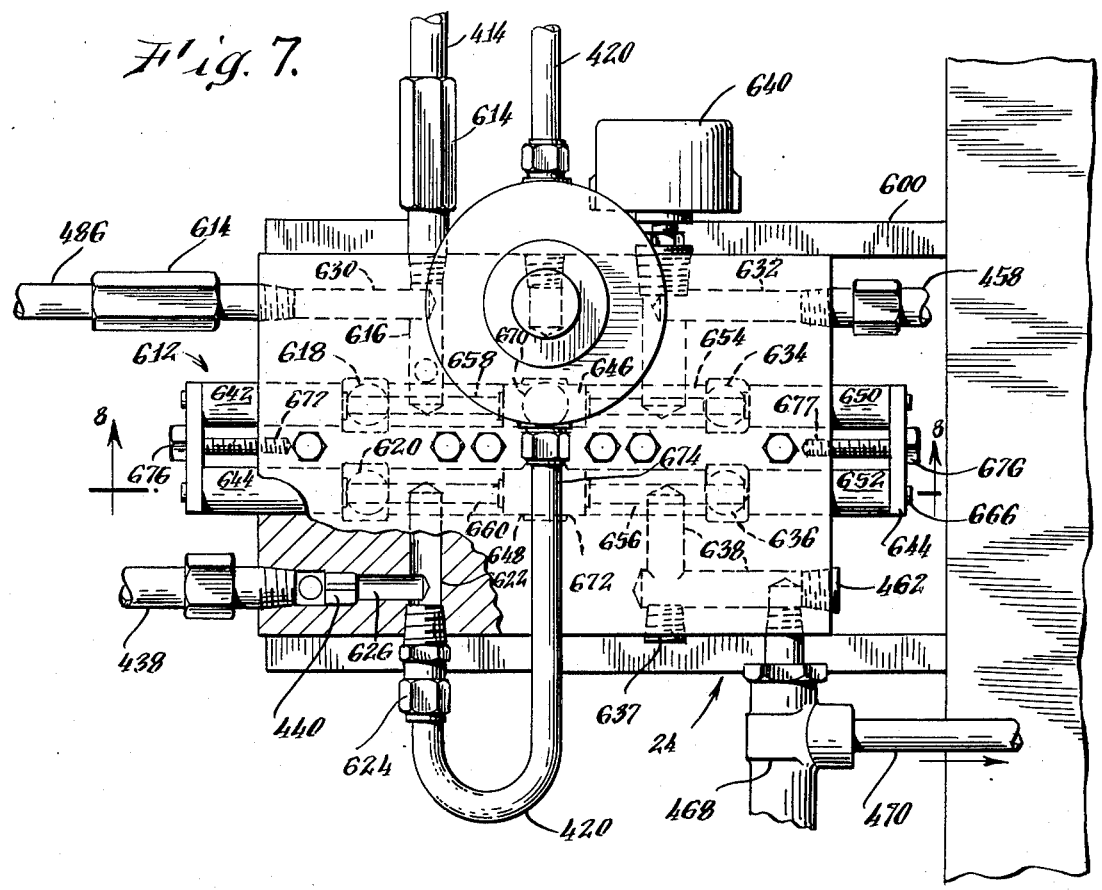
FIG. 7 is a top view of the oil manifold and filter system and associated inlet and outlet lines.
Figure 8:
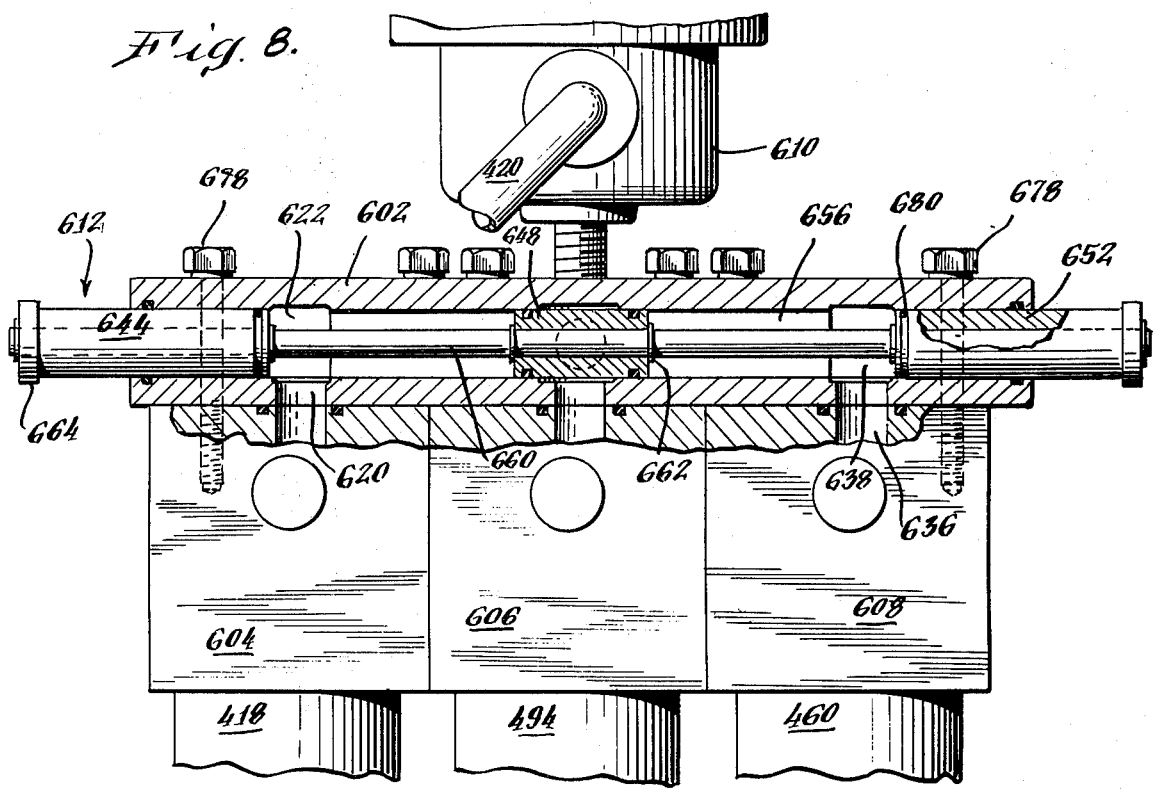
FIG. 8 is a cross-sectional view taken along lines 13—13 of FIG. 7 showing the oil manifold and filter system slide valve.

As will be seen from the description of FIGS. 6-8, the manifold 24 in actuality contains much of the distributive piping here described and shown diagrammatically in FIG. 9. System monitoring and safeguard controls may be provided. For example, the oil tank 412, may include a dip stick 496 for visual observation of the oil level therein and may also have a level indicator 498 which sends a signal via line 500 to be read out on the control panel 20. A strainer may be provided as shown at 499. Temperature and pressure of the oil may be monitored and displayed on guage either on the unit or at the control panel. This is indicated schematically in FIG. 9 where the P's and T's in circle indicate pressure and temperature monitoring. The P and T shown in a box send a signal to the control panel.

Referring to FIGS. 6, 7 and 8, there is shown the oil distribution manifold assembly 24 used in the combined sealing oil and lubrication oil system shown in FIG. 9. FIG. 6 presents an end view of the distribution manifold assembly 24 showing the mounting bracket 600 by which it may be secured to the base plate 12. The manifold assembly 24 includes a solid stainless steel block or plate 602 which has machined passageways for distribution of the sealing and lubrication oil from the pumps through the filters and to the seals and bearings of the compressor. As shown in FIGS. 6–8, removably mounted to the manifold plate 602 are filter cartridges 604, 606 and 608, which contain filter elements 418, 494 and 460, respectively. The filter comprised of filter cartridge 604 containing filter element 418 is a high pressure filter for filtering high-pressure oil while filter cartridge 608 containing filter element 460 is a low pressure filter for the low pressure oil. Filter cartridge 606, containing filter element 494 is a spare filter for either high or low pressure service. Also mounted on the manifold plate 602 is a differential pressure sensor and regulator 610 which carries out the functions of the pressure sensing and regulating elements schematically shown in FIG. 9 at 426 and 430. The manifold plate 602 also includes a piston slide valve 612 which controls the flow of the high and low pressure oil through the filter elements.

Referring now to FIG. 7 showing a top view of the manifold the flow of oil through the manifold will be described. Oil enters the distribution manifold plate 602 from the auxiliary oil pump via a line 414 which is removably connected to the manifold through appropriate fitting 614. The oil in line 414 is at high pressure and passes through the passageway 616 through the opening 618 to the high pressure filter element 418. The filtered oil leaving the high pressure filter element 604 exists via the opening 620 through the passageway 622 from whence it proceeds, as seen also in FIG. 6, via line 420 to the differential pressure regulator 610. The line 420 is connected to the manifold plate 602 and the differential pressure regulator 610 by means of quick connect fittings 624. Branching off from passageway 622 is passageway 626 which contains a pressure reducing orifice 440 from which oil may pass to the line 438 which feeds the hydraulic motor 444 and the fuel valve actuator 442 as shown in FIG. 9.

The differential pressure sensor and regulator 610, shown in FIG. 6, monitors the pressure of the gas in the compressor through gas connection 428 connected through fitting 628. From the pressure regulator 610 high pressure seal oil is transmitted via line 420, connected to the differential pressure regulator via quick connect fitting 624, which feeds the seals of the compressor 14 as shown in FIG. 9. A line 450, not shown in FIGS. 6–8, branches from line 420 and goes to the oil cooler 452 as shown in FIG. 9. Once the main oil pump 482 takes over the function of pumping high pressure oil the oil enters the manifold, not through line 414, but through line 486 connected to the manifold by fitting 614 and passes through the passageway 630 from thence it feeds into the high pressure filter through opening 618.

Lower pressure oil from the cooler to be used for purposes of lubricating the bearings is transmitted to the manifold 24 via a line 458, as shown in FIG. 9, and enters the manifold plate 602 through a passageway 632 from thence it passes into the low pressure filter 460 through opening 634. The filtered oil exits the filter through opening 636 and through the passageways 638 for transmission to the bearings of the compressor via line 462. If desired, lubricating oil may also feed the turbine through a line, shown plugged at 637. Also shown as part of the manifold assembly is the relief valve 468 to maintain the proper pressure and a line 470 leading to the drain to the oil supply. The temperature of the low pressure oil may be sensed in the manifold slot by means of temperature sensor 640.

In the event that either of the high or low pressure filters 418 or 460 become clogged and need replacement or maintenance, the spare filter 494 is readily put into use without the need for shutting down the system by merely operating the piston slide valve 612. The piston slide valve 612 includes three pairs of pistons 642, 644 and 646, 648 and 650, 652, associated, respectively, with the high pressure, spare and low pressure filter openings and slidably positioned in bores 654 and 656 within the manifold plate 602. Each of a pair of the pistons is fixedly secured to a piston rod 658 and 660 at spaced positions which permit the opening and closing of the inlet and outlet openings of the filter elements. The pistons are maintained fixed on the piston rods by means of welded washers as shown at 662 and the piston rods and pistons thereon are each connected to one another by means of end plates 664 and appropriate securing means 666.

Referring to FIGS. 7 and 8, which is a cross-sectional view along the line 13—13 of FIG. 7, the operation of the piston slide valve will now be described. In its open position, permitting flow of high pressure oil through the high pressure filter 418 and low pressure oil through the low pressure filter 460 the piston slide valve 612 is positioned as shown in FIGS. 7 and 8. As shown, the spare filter inlet piston 646 blocks flow of oil in inlet bore 654 on either side thereof and seals off passageway 668 which communicates with the opening 670 leading to the inlet to the spare filter 494. Similarly, outlet spare filter piston 648 seals off the passageway 672 leading to the outlet 674 of the spare filter element 494. Thus, when the slide valve 612 is in the position shown, there is no flow possible through the spare filter element 494 which is valved out.

In the event that a filter becomes clogged and must be replaced, the piston slide valve 612 is reciprocally moved to either the right or left to expose the spare filter inlet and outlet opening 670 and 674 while sealing off the inlet and outlet passageways leading to the inlet and outlet openings of either the high pressure or low pressure filter. For example, if high pressure filter element 418 becomes clogged and must be replaced by removal from cartridge 604, the slide piston 612 is slid to the right in the FIGS. 7 and 13. The degree of travel of the piston valve 612 to the right or left is determined by a stop bolt 676 which will travel in a bore 677 in the manifold plate 602 until it strikes bolt 678 which also secures the filter cartridge.

Thus, sliding the piston valve 612 to the right will cause high pressure inlet piston 642 to block the inlet 618 to the high pressure filter element 418. Simultaneously, high pressure filter outlet piston 644 will block the outlet 620 of the high pressure filter element 418. Hence, flow through passageway 616 into the high pressure filter element 418 will not be possible since it will be valved out but rather will be diverted along the bore 654 to the now exposed inlet 670 to the spare filter which has been exposed and valved in through the movement of the slide valve which has caused piston 646 to move to the right exposing the opening. Similarly, the outlet opening 674 of the spare filter 494 has been exposed by movement of piston 648 to the right so that flow through the spare filter is possible. From the outlet 674, the flow proceeds through the bore 656 to the passageway 622 thus bypassing the high pressure filter 418 which may be removed for cleaning or replacement. In like manner, the low pressure filter 460 may be replaced by sliding the piston valve to the left and blocking off passageways to and from the low pressure filter and exposing the spare filter. The elements are kept in tight relationship by appropriate use of O-rings 680 as shown in the drawings.

Thus, in oil distribution manifold assembly provides a great deal of the piping, schematically illustrated in FIG. 9, in a compact place within a drilled and machine plate which minimizes the possibility of ruptured piping or tubing or maintenance of the same. Therefore, increased compactness and protection suitable for use with the natural gas compressor of this invention is obtained. In addition, only one spare filter need be kept rather than a bank of the same and duplicative piping required to bypass a bank of filters is eliminated. Nor is a compressor shut down necessary for a filter change which is here accomplished quickly and easily by means of hand movement of the piston slide valve and removal of the filter.

The gas turbine-compressor unit package shown and described generally and in detail herein in relation to an embodiment thereof is particularly suitable for natural gas application. Since the gas turbine and centrifugal compressor are relatively lightweight and there are no reciprocating forces, operation is smooth and vibration free and installation requires no foundation and comparatively little space. Thus, the unit is particularly versatile and adaptable to many uses. The lubrication and sealing oil system and the filter manifold may be considered to have applicability in other than the gas turbine-compressor unit of this invention and it will be understood by those skilled in the art that such may be obtained.

I claim:

1. An integrated oil system for providing lubricating and sealing oil to the bearings and oil seals of a gas compressor comprising a reservoir means containing thhe system oil, pump means for pumping the system oil at a pressure higher than the pressure of the gas in the compressor, seal oil feed means for conducting this higher pressure oil to the oil seals of the compressor, oil pressure reducing means for taking a portion of the higher pressure oil and reducing its pressure to a pressure lower than the pressure of the gas in the compressor suitable for lubricating bearings, lubrication oil feed means for conducting this lower pressure oil to the bearings of the compressor for lubrication thereof, and drain means for draining the oil from the bearings and seals back to the reservoir means.

2. An integrated oil system as claimed in claim 1 further including means for cooling the lower pressure oil prior to conducting it to the compressor bearings.

3. An integrated oil system as claimed in claim 2 wherein the cooling means comprises a cooling coil, a cooling fan and a hydraulic motor means for driving the cooling fan, further including hydraulic oil feed means for conducting system oil to the hydraulic motor to operate it.

4. An integrated oil system as claimed in claim 3 wherein the hydraulic oil feed means includes oil pressure reducing means for taking a portion of the higher pressure oil and reducing its pressure to a pressure sufficiently low to avoid damage to the hydraulic motor but sufficiently high to operate the motor, and means for conducting the oil exiting the hydraulic motor to the bearings of the compressor for lubrication thereof.

5. An integrated oil system as claimed in claim 4 further including means for conducting at least a portion of the oil exiting the hydraulic motor through the cooling coil prior to conducting it to the compressor bearings.

6. An integrated oil system as claimed in claim 5 further including temperature sensing means for sensing the temperature of lubricating oil to be conducted to the compressor bearings, signalling means for transmitting a signal relating to temperature sensed, control means responsive to the temperature signal for controlling the lubricating oil temperature, the control means including regulating valve means for regulating oil flow through the cooling means.

7. An integrated oil system as claimed in claim 1 further comprising high pressure oil filter means for filtering the higher pressure oil, lower pressure oil filtering means for filtering lower pressure oil, spare filter means capable of filtering either higher or lower pressure oil and valve means interconnecting all filter means, the valve means including means for transferring flow of oil from either the higher or lower pressure filter means to the spare filter means, without affecting the oil flow in the other filter means and without interrupting oil flow in the system.

8. A combination bearing and oil seal for the compressor unit as claimed in claim 1 wherein the compressor casing means includes an end cover in which is mounted a first cartridge assembly means within which the rotor assembly is mounted, the first cartridge assembly means comprising a cartridge housing, high speed thrust and journal bearing means and high pressure mechanical oil seal means, second cartridge assembly means mounted in the compressor casing means where the compressor shaft means extends therethrough, the second cartridge assembly means comprising a cartridge housing, high speed journal bearing means and high pressure mechanical oil seal means.

9. A combination bearing and oil seal as claimed in claim 8 wherein the cartridge assembly means include pressure reducing means for reducing the pressure of high pressure sealing oil to a pressure suitable for lubricating the bearing means therein.

* * * * *